United States Patent [19]

O'Connor et al.

[11] 3,859,263
[45] Jan. 7, 1975

[54] PREPARATION OF UNSATURATED COPOLYMERS

[75] Inventors: James M. O'Connor, Stow; Richard R. Smith, Cuyahoga Falls; Joginder Lal, Akron, all of Ohio

[73] Assignee: The Goodyear Tire & Rubber Company, Akron, Ohio

[22] Filed: July 27, 1973

[21] Appl. No.: 383,213

[52] U.S. Cl. ......... 260/80.78, 260/88.2 E, 260/666, 260/677 R, 260/683 D, 260/683.15 D
[51] Int. Cl. ....... C07c 3/00, C07c 13/02, C08f 1/72, C08f 5/00
[58] Field of Search ............... 260/93.1, 88.2, 80.78

[56] References Cited
UNITED STATES PATENTS

| | | | |
|---|---|---|---|
| 3,439,057 | 4/1969 | Calderon | 260/666 |
| 3,754,046 | 8/1973 | Calderon et al. | 260/677 R |
| 3,692,872 | 9/1972 | Calderon et al. | 260/878 R |
| 3,790,543 | 2/1974 | Lehnert et al. | 260/93.1 |
| 3,781,257 | 12/1973 | Pampus et al. | 260/88.2 D |

OTHER PUBLICATIONS

Calderon, et al., J. of Polymer Science, part A-1, 1967, Vol. 5, pp. 2,209–2,217.
Calderon, et al., J. Amer. Chem. Soc., 1968, Vol. 90, pp. 4,133–4,140.
Natta, et al., Angew. Chemie. Internat'l Editn., 1964, Vol. 3, pp. 723–729.
Natta, et al., Polymer Chemistry of Synthetic Elastomers, Part II, 1969, (Interscience) pp. 703–726.
Symposium on Polymerization and Related Reactions by Metathesis, Polymer Preprints (American Chemical Society) August 1972, Vol. 13, No. 2, pages 874–923.

*Primary Examiner*—John C. Bleutge
*Assistant Examiner*—A. L. Clingman
*Attorney, Agent, or Firm*—F. W. Brunner; J. Y. Clowney; R. A. Thompson

[57] ABSTRACT

A method of preparing high molecular weight sulfur vulcanizable copolymers by bringing together under solution polymerization conditions an $\alpha$-olefin with the reaction product resulting from the cross-metathesis reaction of an $\alpha$-olefin and a cyclomonoolefin or nonconjugated cyclopolyolefin in the presence of an olefin cross-metathesis catalyst.

Sulfur vulcanizable unsaturated rubberlike copolymers produced by the process described herein are also claimed.

12 Claims, No Drawings

PREPARATION OF UNSATURATED COPOLYMERS

This invention is directed to a method of polymerization for preparing unsaturated copolymers of $\alpha$-olefins and polyenes and to the composition of copolymers produced thereby.

More specifically, this invention involves novel copolymers which are prepared by a two-stage procedure. A copolymerizable nonconjugated acyclic polyolefin mixture is produced in the first stage, and in the second stage an $\alpha$-olefin is added and is copolymerized with the nonconjugated acyclic polyolefin mixture produced in the first stage.

The first stage reaction involves a cross-metathesis reaction which has been recently discovered. The cross-metathesis reaction utilized in this invention is a reaction wherein, for instance, an $\alpha$-olefin is reacted with a cyclomonoolefin or nonconjugated cyclopolyolefin in the presence of a metathesis catalyst to give a product which is a mixture of nonconjugated acyclic polyolefins, principally acyclic dienes and trienes. By this process, relatively inexpensive cyclomonoolefins or nonconjugated cyclopolyolefins, which in themselves are not sufficiently reactive comonomers to be advantageously incorporated into copolymers, are converted to monomers readily copolymerizable with $\alpha$-olefins in the second stage to yield unsaturated copolymers. These unsaturated copolymers possess high molecular weights.

Thus, according to this invention, high molecular weight sulfur vulcanizable copolymers can be prepared by bringing together under solution polymerization conditions an $\alpha$-olefin with the reaction product resulting from the cross-metathesis reaction of an $\alpha$-olefin and a cyclomonoolefin or nonconjugated cyclopolyolefin in the presence of an olefin cross-metathesis catalyst.

It is not predictable from the prior art that by employing the second stage catalyst, copolymerization to yield an unsaturated high molecular polymer will occur between an $\alpha$-olefin and the cross-metathesis reaction product derived from an $\alpha$-olefin and a cyclomonoolefin or nonconjugated cyclopolyolefin, while there is still present the first stage catalyst. The attainment of high molecular weight is thus a novel attribute of this invention.

The thrust of this invention is not directed to the particular use of the catalysts of the first stage or second stage, for they are well known in the art. Instead, it is directed to the unexpected results obtained, that is, the polymerization to form high molecular weight materials, when the catalyst from the second stage is used in the presence of the catalyst from the first stage to give the sulfur vulcanizable material as outlined above.

The cross-metathesis product resulting from the reaction of an $\alpha$-olefin and a cyclomonoolefin is a mixture of linear nonconjugated acyclic polyolefins. For instance, the reaction between 1-hexene and cyclooctene in the presence of a catalytic amount of tungsten hexachloride ethanol/ethylaluminum dichloride ($WCl_6 \cdot C_2H_5OH/EtAlCl_2$) catalyst wherein the 1-hexene/cyclooctene molar ratio is 2 to 1, results in compounds belonging to three different series. The Series X compounds which comprise the bulk of the material formed may be represented by the general formula

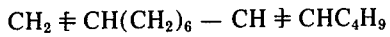

Specific members of Series X are $C_{14}H_{26}$ (1,9-tetradecadiene; when $n$ is 1), $C_{22}H_{40}$ which is triene (when $n$ is 2) and $C_{30}H_{54}$ which is a tetraene (when $n$ is 3). These compounds contain a terminal double bond and one or more internal double bonds.

Series Y compounds, comprising a minor portion of the product, may be represented by the general formula

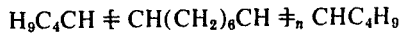

Specific members of Series Y are $C_{10}H_{20}$ (5-decene when $n$ is O); $C_{18}H_{34}$ which is a diene (when $n$ is 1); and $C_{26}H_{48}$ which is triene (when $n$ is 2). These compounds have internal double bonds only and are much less reactive for copolymerization with an $\alpha$-olefin than the compounds belonging to Series X.

Series Z compounds, also comprising a minor portion of the cross-metathesis product, have terminal double bonds and may also contain internal double bonds. They may be represented by the formula

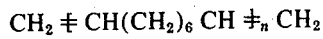

Specific compounds of this series are $C_{10}H_{18}$ (1,9-decadiene; $n$ is 1). $C_{18}H_{32}$ (1,9,17-octadecatriene; $n$ is 2; contains one internal and two terminal double bonds), $C_{26}H_{48}$ (a tetraene; $n$ is 3) which contains two internal and two terminal double bonds.

It is apparent that copolymerization of an $\alpha$-olefin with the cross-metathesis reaction product from 1-hexene and cyclooctene will result in the formation of polymers having pendant groups derived from compounds of Series X and Z and containing internal and terminal double bonds. For instance, the pendant group from $C_{22}H_{40}$ (Series X; $n$ is 2) will contain two internal double bonds, whereas the pendant group from $C_{18}H_{32}$ (Series Z; $n$ is 2) will contain one internal double bond and one terminal double bond.

In the specific case when ethylene is used in the cross-metathesis reaction with a cyclomonoolefin or nonconjugated cyclopolyolefin, only components belonging to Series Z will be obtained in the cross-metathesis product. Copolymerization of this cross-metathesis product with an $\alpha$-olefin will result in the formation of copolymers having pendant groups which contain either terminal double bonds only, or both terminal and internal double bonds.

In carrying out the cross-metathesis reaction, one or more $\alpha$-olefins may be reacted with one or more cyclomonoolefin and/or nonconjugated cyclopolyolefin without departing from the scope and spirit of this invention.

Catalysts which are operable according to the first stage of the present invention, i.e., for olefin metathesis, are those catalysts which will, when present in catalytic amounts, convert 2-hexene into a mixture of 2-butene and 4-octene at ambient conditions.

One class of homogeneous catalyst systems employed in the practice of this invention is a system comprising (A) at least one organometallic compound wherein the metal is selected from the group consisting of Ia, IIa, IIb, IIIa and IVa of the Periodic Table of Elements, (B) at least one metal derivative wherein the metal is selected from the group consisting of molybdenum and tungsten and (C) at least one material selected from a group consisting of oxygen and compounds of the general formula R — Y — R', wherein Y is selected from the group of oxygen (O) and sulfur (S) and wherein R and R' are radicals selected from the group consisting of (1) hydrogen (H), (2) alkyl, (3) aryl, (4) arylalkyl, (5) alkaryl, (6) alkenyl, (7) when Y is S and R' is H, then R can be thioalkyl, thioarylalkyl, and thioalkaryl, (8) when Y is O and R' is H, then R can be alkoxy, arylalkoxy and alkaryloxy, and (9) radicals of (2 through (8) wherein at least one hydrogen is substituted by a group selected from hydroxyl (OH) and thiol (SH). The Periodic Table of Elements referred to may be found in the Handbook of Chemistry and Physics, 44th Edition, April 1962 reprint, published by the Chemical Rubber Publication Company, Cleveland, Ohio, U.S.A. p. 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, thallium and tin. The preferred organometallic compounds are compounds of lithium, sodium, magnesium, aluminum, zinc and tin, with aluminum and tin being most preferred.

Representative examples of organometallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum, and the like; triarylaluminums such as tritolylaluminum, tribenzylaluminum, triphenylaluminum, and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkylaluminum halides and alkylaluminum dihalides such as ethylaluminum sesquichloride and bromide may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride, and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like. Other organometallic compounds are also useful in the practice of this invention. Representative of such organo-metallic compounds are organoalkali metal compounds such as alkyllithium compounds as ethyllithium, n-butyllithium, t-butyllithium and the like; lithium aluminum tetraalkyls such as lithium aluminum tetrabutyl, lithium aluminum-tetraethyl, and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide, and the like; calcium, strontium and barium organo compounds such as barium alkyls and aryls of Groups IIb metals such as diethylzinc, diphenylzinc, ethylzinc chloride, diethylcadmium, dibutylcadmium, and the like. Grignard agents such as phenylmagnesium bromide may also be employed. organotins, such as tetraalkyltin, tetraarylalkyltin, trialkyltin halides and triaryltin halides may also be employed as an organometallic compound. Representative of such organotin compounds are tetramethyltin, tetrabutyltin, tetrabenzyltin, triethyltin chloride, triphenyltin chloride and the like. Mixtures of these compounds may be employed as the first or (A) catalyst component in the catalyst of this invention. It is usually preferred to employ aluminum compounds such as trialkylaluminums, dialkylaluminum halides, alkylaluminum dihalides and alkylaluminum sesquihalides.

The metal derivatives employed in the catalyst of this invention as the second or (B) catalyst component are selected from the derivatives of molybdenum and tungsten. Representatives of such derivatives include halides such as chlorides, bromides, iodides and fluorides, which include compounds such as molybdenum pentachloride, tungsten hexachloride, molybdenum pentabromide, tungsten hexabromide, molybdenum pentaiodide, molybdenum pentafluoride, molybdenum hexafluoride and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides, representative of which are tungsten hexachloride and molybdenum pentachloride.

The third component or (C) component of the catalyst system of this invention is selected from the group consisting of oxygen and compounds which respond to the formula R — Y — R' wherein Y is selected from the group consisting of oxygen and sulfur and R and R' are radicals selected from the group consisting of (1) hydrogen, (2) alkyl, (3) aryl, (4) arylalkyl, (5) alkaryl, (6) alkenyl, (7) when Y is S and R' is H, then R can be thioalkyl, thioarylalkyl, and thioalkaryl, (8) when Y is O and R' is H, then R can be alkoxy, arylalkoxy and alkaryloxy, and (9) radicals of (2) through (8) wherein at least one hydrogen is substituted by a group selected from hydroxyl (OH) and thiol (SH).

Thus, the formula R — Y — R' above defines a number of types of compounds. It defines water (HOH), hydrogen sulfide (HSH), both saturated and unsaturated alcohols (ROH), mercaptans, (RSH), hydroperoxides (ROOH), hydrodisulfides (RSSH), polyalcohols (HOROH), polymercaptans (HSRSH), hydroxy mercaptans (HSROH) or thioalcohols (HORSH) and ethers and thioethers. Representative examples of the materials corresponding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl and similar mercaptans, allyl mercaptan, thiophenol, 4-methylthiophenol, 4-mercaptoxylene; the hydroperoxides such as cumyl hydroperoxide, tertiarybutyl hydroperoxide; the hydrodisulfides such as cumyl hydrodisulfide, s-butyl hydrodisulfide, the polyalcohols such as ethylene glycol, glycerol, and similar polyglycols; catechol, resorcinol, hydroquinone, pyrogallol; the polymercaptans such as 1,3-propane dithiol, 1,4-dimercaptobenzene, the hydroxymercaptans or thioalcohols such as 2-mercaptoethanol and p-mercaptophenol; ethers such as dimethylether, diethylether, dibutyl ether, anisole.

Other materials which can function as the third component (C) are described in recent literature (Symposium on Polymerization and Related Reactions, Polymer Preprints, Vol. 13, No. 2, pp. 874–923,(1972), American Chemical Society Meeting, Sept. 1972).

It has been found that good results are obtained in the practice of this invention when the molar relationship between the three catalyst components, (A), (B) and (C) as previously defined, are within a molar ratio of (B)/(C) ranging from about 0.2/1 to at least about 20/1 and the molar ratio of (A)/(B) is within the range of about 0.5/1 to at least 15/1. More preferred ratios are (B)/(C) of 0.5/1 to 5/1 and (A)/(B) of 0.5/1 to 8/1. Still more preferred ratios are (B)/(C) of 1/1 to 2/1 and (A)/(B) of 0.75/1 to 5/1.

The amount of catalyst employed in the reactions of this invention may be varied over wide concentrations and has not been found to be critical. Of course, a catalytic amount of the catalyst must be employed. The optimum amount of catalyst depends upon a number of factors such as temperature, purity of reactants, reaction times desired, and the like. The processes of this invention can be conducted wherein the amount of catalyst employed is about 0.01 part by weight of component (B) per 100 parts by weight of unsaturated reactants employed, with components (A) and (C) adjusted to yield a desirable molar ratio of (A)/(B)/(C). Those skilled in the art will readily be able to determine the optimum catalytic ranges.

A second class of catalyst systems effective in the present invention consists of a two-component catalyst system. This catalyst system comprises (A) at least one organoaluminum halide selected from the group consisting of $RAlX_2$ and $R_2AlX$ wherein X is a halide such as chloride, bromide, iodide, and fluoride, and R is selected from the group of alkyl, aryl, arylalkyl and alkaryl, and (B) at least one tungsten derivative.

Thus, representative examples of the first or (A) catalyst component are aluminum compounds having at least one aluminum-to-carbon bond. Representative of such compounds are dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide, and the like; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like.

Representative of the tungsten salts employed as the second or (B) catalyst component include halides such as chlorides, bromides, iodides, and fluorides, which include compounds such as tungsten hexachloride, tungsten hexabromide, tungsten hexaiodide, and tungsten hexafluoride. Other representative salts are those of acetylacetonates, sulphates, phosphates, nitrates and the like which include compounds such as tungsten phosphate, tungsten nitrate, tungsten acetylacetonate and tungsten sulphate. Mixtures of these salts may also be employed. Of these, it is usually preferred to employ tungsten halides such as tungsten hexachloride.

The molar relationship between the two catalsyst components (A) and (B) as previously defined in this catalyst system are within a molar ratio of (A)/(B) of about 0.5/1 to about 15/1 with a more preferred molar ratio of (A)/(B) of about 0.5/1 to about 8/1 and a still more preferred molar ratio of (A)/(B) of about 0.75/1 to about 5/1. These catalysts can be prepared by "in situ" or "preformed" techniques. No particular order of addition is required in preparing active catalysts from this species. These catalyst components may be reacted together as pure compounds or in solutions or suspensions in inert liquids. Representative of such liquids are saturated hydrocarbons such as pentane, hexane and the like or aromatic hydrocarbons such as benzene, toluene and the like.

The amount of catalyst employed in the reactions of the present invention, when this two-component catalyst system is employed, has not been found to be critical and may range over wide concentrations. Of course, a catalytic amount of the catalyst must be employed but the optimum amount depends upon a number of factors such as temperature employed, the particular reactants employed, the purity of the reactants, the reaction times desired, and the like. Polymerization reactions can be conducted wherein the amount of catalyst is about 0.01 part by weight of the (B) component per 100 parts by weight of the monomer employed with the proper mole ratio of (A)/(B) being adjusted.

A third class of catalyst systems effective in promoting the processes of the present invention consists of (A) an aluminum halide, $AlX_3$, and (B) a salt of the transition metal tungsten, whereby the tungsten is at any oxidation status within the IV to VI range.

Representative examples of component (A) are: aluminum chloride, aluminum bromide, aluminum iodide and aluminum fluoride. The preferred halides are the chloride and bromide of aluminum. Examples of component (B) are: tungsten tetra-, penta- and hexachlorides, tungsten tetra- and pentabromides, tungsten tetra- and pentaiodides, tungsten hexafluoride and the tungsten oxychlorides. This two component catalyst system is unique as it does not require the employment of any organometallic catalyst component. However, this system can be further modified by an organometallic reagent. (In certain reactions of unsaturated alicyclic compounds, advantages such as suppression of gel formation, and an increase in polymerization rates at lower catalyst levels can be achieved by the modification of the last two-component catalyst system by an optional third organometallic reagent). Examples of such optional organometallic reagents are organoalkali metal compounds such as alkyl- and aryllithium alkyl- and arylsodium; organomagnesium compounds such as dialkylor diarylmagnesium, organomagnesium halides; organometallic derivatives of calcium, strontium and barium; alkyls and aryls of Groups IIb metals such as dialkyl- and diarylzinc and the like.

The second stage of the present invention may be accomplished by the use of catalysts generally known as coordination catalysts. These are made from components of two types: first, compounds of the transition heavy metals of Groups IVb and Vb of the Periodic Table, and second, organometallic compounds. The transition metal salt may be one or more salts of a transition metal such as titanium, zirconium, hafnium, vanadium, niobium or tantalum. Preferably the salt is a halide, more preferably a chloride, but other salts such as the oxyhalides, alcoholates, sulfates, nitrates, phosphates, acetates, propionates, benzoates, acetylacetonates, etc. are also utilizable.

Some examples of such salts are titanium tetrachloride, titanium trichloride, zirconium trichloride, hafnium tetrachloride, vanadium oxytrichloride, niobium pentabromide, tantalum pentaiodide, etc. The preferred salts are the halides of titanium and vanadium. Ordinarily the transition metal salt is employed in an amount such as to provide about 0.0002–0.01, preferably about 0.0003–0.0004 mole of transition metal per mole of copolymer being treated.

The organometallic component of the catalyst system may be one or more organometallic compounds of metals of Groups, Ia, IIa, IIb and IIIa of the Periodic Table of Elements. When the metal of the organometallic compound is multivalent, any valence not satisfied by an organic group may be satisfied by hydride, chloride, bromide, iodide, or fluoride. The organic groups in these compounds are preferably alkyl groups containing 1–10 carbon atoms or aryl groups such as phenyl, tolyl, or naphthyl.

Exemplary of the organomettalic compounds are methyllithium, butyllithium, phenyllithium, naphthyllithium, ethylsodium, propylpotassiums, butylrubidiums, pentylcesiums, octylberyllium chlorides, dimethylmagnesium, methylmagnesiumbromide, diethylcalcium, ethylcalcium iodide, dipentylstrontiums, naphthlstrontium fluorides, dipropylbariums, phenylbarium chloride, dihexyl zincs, ethylzinc chloride, dioctylcadmiums, butylcadmium chlorides, pentylgallium bromides, hexylindium chlorides, heptylthallium chlorides, trimethylaluminum, triethylaluminum, tripropylaluminum, tributylaluminums, tripentylaluminums, trihexylaluminums, triheptylaluminums, trioctylaluminums, trinonylaluminums, tridecylaluminums, triphenylaluminum, trinaphthylaluminums, tritolylaluminums, trimethylnaphthylaluminums, the corresponding hydrocarbyl aluminum hydrides and dihydrides, and the corresponding hydrocarbylaluminum chlorides, dichlorides, bromides, dibromides, iodides, diodides, fluorides and difluorides, etc. Other examples of organometallic components are diethylaluminum ethoxide, diisobutylaluminum methoxide and lithium aluminum tetraethyl. Preferably the organometallic compound is an aluminum compound, more preferably an alkylaluminum halide. The organometallic compound is usually employed in an amount so as to provide an organometallic compound/transition metal salt molar ratio of about 0.5–15, preferably about 0.75–5, most preferably about two.

It is well-known in the prior art that a variety of compounds may be used in conjunction with coordination catalysts to modify the olefin polymerization reaction rate, stereospecificity of the polymerization process and molecular weight distribution of the polymers. Examples of such modifiers are: alcohols, phenols, mercaptans, ethers, thioethers, amines, phosphines, phosphoramides, etc. Such modified catalysts are also within the scope of this invention.

The amount of stage two catalyst by weight is from about 0.1 to about 10 phm (parts per hundred parts monomer), the preferred range being about 0.5 to 5 phm.

The α-olefins which can be utilized advantageously in the first stage and the second stage reactions are the compounds having from 2 carbon atoms through 20 carbon atoms. Representative of such compounds are ethylene, propylene, 1-butene, 1-hexene, 1-heptene, 1-octene, 1-nonene, 1-decene and 1-octadecene. The α-olefin does not necessarily have to be linear in nature. Other α-olefins such as vinyl cyclohexene and nonconjugated diolefins such as 1,5-hexadiene, 1,7-octadiene and trans-1,4-hexadiene are less preferred but may also be utilized.

Cyclomonoolefinic compounds which can be utilized advantageously in the first stage reaction are cyclobutene, cyclopentene, cyclooctene, cyclononene, cyclodecene, cycloundecene and cyclododecene. Also, nonconjugated cyclopolyolefins may be utilized in the first stage reaction. Some representative examples are 1,5-cyclooctadiene, 1-methyl-1,5-cyclooctadiene, 1-chloro-1,5-cyclooctadiene and 1,5,9-cyclododecatriene.

In carrying the copolymerization reaction of the second stage, one or more α-olefins may be reacted with the cross-metathesis product without departing from the scope and spirit of this invention.

The polymerizations should be conducted in an inert solvent. By inert solvent is meant one that will not adversely affect the reaction rate or reaction product. Convenient solvents are aliphatic, aromatic or cycloaliphatic hydrocarbons. Representatives of such solvents are heptane, hexane, benzene, toluene, cyclohexane and the like. Chlorinated hydrocarbon such as trichloroethylene, tetrachloroethylene, chlorobenzene, etc. may be used.

Both reaction stages involved in this invention can be carried out over a wide range of temperatures. It is convenient to carry out the process at temperatures of −20°C. to 100°C., preferably 0°C. to 50°C.

EXPERIMENTAL

Unless otherwise specified the following solutions and suspensions were used for carrying out the cross-metathesis reaction and the copolymerization reaction.

Tungsten hexachloride·ethyl alcohol ($WCl_6 \cdot EtOH$) was used as a 0.05 molar solution in benzene. An appropriate amount of ethyl alcohol was added to the tungsten hexachloride solution to form the complexed compound. Tungsten hexafluoride ($WF_6$) was used as a 0.20 molar solution in hexane.

Ethylaluminum dichloride ($EtAlCl_2$) was used as a 0.16 molar solution in benzene.

Triethylaluminum ($Et_3Al$) was used as a 1.56 molar solution in heptane.

Triethylaluminum-titanium tetrachloride-vanadium tetrachloride ($Et_3Al$-$TiCl_4$-$VCl_4$) was preformed at 90°C. and the resulting suspension used as a polymerization catalyst in heptane. The titanium and vanadium halides together constituted 0.50 molarity, with the atomic ratio of titanium/vanadium (Ti/V) = 1 and the aluminum/(titanium plus vanadium) Al/(Ti+V) = 0.40.

Tetrabutyltin ($Bu_4Sn$) was used as a 0.20 molar solution in chlorobenzene.

Tungsten hexachloride·2 diethyl ether ($WCl_6 \cdot 2Et_2O$) was used as a 0.05 molar solution in chlorobenzene. An appropriate amount of diethyl ether was added to the tungsten hexachloride solution to form the complex compound.

Alpha-titanium trichloride·1/3 aluminum trichloride ($\alpha$-$TiCl_3 \cdot 1/3$ $AlCl_3$) was used as a 1.0 molar suspension in heptane.

Ethylaluminum sesquichloride ($Et_3Al_2Cl_3$) was used as 0.42 molar solution in benzene.

Vanadium oxytrichloride ($VOCl_3$) was used as a 0.08 molar solution in benzene.

As employed in this specification, inherent viscosity is defined as the natural logarithm of the relative viscosity at 30°C. divided by the polymer concentration for a 0.05 to 0.10 percent (w./v.) solution in benzene containing 0.1 percent phenyl-2-naphthylamine (PBNA) and expressed in units of deciliters per gram (dl./g.). Percent insolubility of vulcanizates in toluene was determined at 25°C. after immersion in toluene for 72 hours by placing one gram of sample in 200 milliliters (ml.) of toluene. The toluene solvent was changed after 24, 48 and 72 hours. The swollen sample was weighed and subsequently dried under vacuum to determine the weight of insoluble gel. From the same measurement, swelling ratio, Q, of the gel fraction was calculated as the ratio of the weight of toluene in the swollen sample to the weight of the toluene-insoluble gel. The percent insolubility and swelling ratio were corrected for the amount of filler present in a vulcanizate.

Unless stated otherwise, all polymerization reactions were conducted in a nitrogen atmosphere. The polymerization mixture was precipitated in excess methanol containing 0.2 precent PBNA, followed by drying under reduced pressure.

The practice of this invention is illustrated by reference to the following examples which are intended to be representative rather than restrictive of its scope.

EXAMPLE 1-8

In examples 1 and 2, 1-pentene and cyclooctene were used to make the cross-metathesis product in stage one and 1-pentene was used as the α-olefin in the copolymerization reaction of stage two. In examples 3 through 8, 1-hexene was reacted with four different cyclomonoolefins and cyclodienes to make the cross metathesis product in stage one and 1-hexene was used in the copolymerization reaction of stage two.

In examples 1 through 8, the cross-metathesis reactions and copolymerization reactions were conducted in dry, clean reaction vessels. The atomic ratio of the Aluminum (Al)/Tungsten (W) in the $EtAlCl_2$/$WCl_6$·EtOH cross-metathesis catalyst was 3/1. The molar ratio of the (α-olefin + cyclooelfin)/$WCl_6$ was 5000/1. The molar ratio of the α-olefin/cycloolefin was 2/1. In example 1, the cross-metathesis reaction product was prepared by charging 68 ml. cyclooctene, 104 ml. 1-pentene and 200 ml. benzene to the reaction vessel and sparging for 3 minutes with nitrogen. The cross-metathesis catalyst, 7.5 ml. of ethylaluminum dichloride ($EtAlCl_2$) and 8.0 ml. of tungsten hexachloride·ethylalcohol ($WCl_6$·EtOH) were syringed into the solution and the vessel closed. After agitation on a mechanical shaker for 2 hours at room temperature, the reaction product was used as is, i.e., without catalyst removal, in the copolymerization reaction. Gas liquid chromatography (GLC) analysis of the reaction mixture was carried out to determine the conversion of cyclooctene to products. By knowing the conversion of cyclooctene to the cross-metathesis product, one can determine the amount of additional α-olefin to add to the cross-metathesis product in order to obtain the final desired molar ratio of α-olefin to cross-metathesis product in the copolymerization reaction.

In example 1, in order to obtain a final 95:5 molar ratio of α-olefin/metathesis product in the copolymerization reaction, a solution of 91 ml. of 1-pentene, 180 ml. of benzene and 36.5 ml. of the product made by the cross-metathesis reaction was added to a clean dry reaction vessel. The solution was sparged with nitrogen for 5 minutes and then 0.6 ml. of $Et_3Al$ and 0.90 ml. of the preformed aluminum-titanium-vanadium (Al—Ti—V) catalyst were injected.

In example 2, a 90:10 final molar ratio of α-olefin/metathesis product was obtained in the copolymerization reaction. Similar procedure and catalysts were utilized as in example 1 except that 59 ml. of 1-pentene, 142 ml. of benzene and 55 ml. of the product made from the cross-metathesis reaction were utilized.

In examples 3 through 8 similar procedures were used as those in examples 1 and 2 except that different α-olefins and cycloolefins or cyclodienes were utilized and different amounts used to achieve the final molar ratios of α-olefin/metathesis product as shown in Table 1.

The data in examples 1 through 6 show that high molecular weight copolymers are obtained having inherent viscosity values of 2.4–4.6. Unsaturation values are also shown for three of the copolymers.

Table 1

EXAMPLES 1-8

Copolymerization [a] of 1-Pentene or 1-Hexene with the Metathesis Products Derived from Different Cycloolefins and Cyclodienes

| | Metathesis Reaction | Copolymerization | | Copolymer | |
|---|---|---|---|---|---|
| Example No. | Cycloolefin or Cyclodiene/α-Olefin | α-Olefin | α-Olefin/Metathesis Prod. Molar Ratio [b] | η dl./g. | Unsat. [c] Mole/kg. |
| 1 | Cyclooctene/Pentene | Pentene | 95:5 | 3.1 | — |
| 2 | Cyclooctene/Pentene | Pentene | 90:10 | 2.9 | — |
| 3 | Cyclooctene/Hexene | Hexene | 95:5 | 3.8 | 0.43 |
| 4 | Cyclooctene/Hexene | Hexene | 90:10 | 4.6 | — |
| 5 | Cyclopentene/Hexene | Hexene | 95:5 | 3.6 | 0.40 |
| 6 | 1-methyl-1,5-Cyclo-octadiene/Hexene | Hexene | 95:5 | 2.4 | 0.28 |
| 7 | 1,5-Cyclooctadiene/Hexene | Hexene | 97.5:2.5 | 1.0 | — |
| 8 | 1,5-Cyclooctadiene/Hexene | Hexene | 95:5 | 0.8 | — |

[a] All copolymerizations were carried out at room temperature to at least 60% conversion.
[b] Represents the ratio of the total amount of α-olefin available for copolymerization to the total amount of cycloolefin or cyclodiene consumed during the metathesis reaction.
[c] Determined by iodine monochloride.

EXAMPLES 9-10

These examples show that there is unsaturation in the copolymers of Examples 1 and 2 made by this invention and that they can be cured by a typical sulfur recipe employed for a low unsaturation rubber. Low values of the swelling ratio and low values of percent solubility show that the vulcanizates have achieved high degrees of cure.

Some Properties of Vulcanizates[a]
Of 1-Pentene Copolymers

| | Example 9 | Example 10 |
|---|---|---|
| | Pentene Copolymer | |
| Property | Copolymer of Ex. 1 | Copolymer of Ex. 2 |
| Tensile Strength, psi | 1857 | 1452 |
| Elongatation at Break, % | 516 | 372 |
| 300% Modulus, psi | 1137 | 1169 |
| Swelling Ratio, Q | 2.6 | 2.8 |
| % Solubility | 12.7 | 18.0 |

[a] Compounding recipe: All parts are expressed by weight.

| | |
|---|---|
| Rubbery copolymer | 100.0 |
| ISAF Black | 50.0 |
| Zinc Oxide | 5.0 |
| Mercaptobenzothiazole | 0.5 |
| Tetramethylthiuram Disulfide | 1.0 |
| Sulfur | 2.0 |

Curing conditions: Samples for stress-strain measurement were cured for 25' at 300°F.; Q and % solubility data on samples cured for 15' at 300°F.

EXAMPLES 11-14

In Examples 11 through 14, a series of cross-metathesis reactions and copolymerization reactions was run under similar conditions as in Examples 1–8, except that 1-hexene was the α-olefin and cyclooctene was the cyclomonoolefin. To the cross-metathesis reaction product, varying amounts of 1-hexene were added for the copolymerization reaction in order to vary the final molar ratio of 1-hexene (α-olefin) to the product derived from the cross-metathesis reaction. Data on the copolymers obtained are shown.

Each of the copolymers was compounded according to the recipe in Examples 9 and 10 except that ISAF carbon black was omitted. Curing was done at 310°F. for 30 minutes. Q and % solubility data on the vulcanizates are also given in the table below:

| | Copolymers | | | | Vulcanizates | |
|---|---|---|---|---|---|---|
| Ex. No. | Hexene/Cross-Metathesis Product* | Conversion % | Inherent Viscosity | % Unsat., Mole/Kg | Q | % Sol. |
| 11 | 92/8 | 85 | 4.1 | 0.37 | 5.2 | 5.1 |
| 12 | 80/20 | 79 | 4.1 | — | 5.0 | 7.6 |
| 13 | 70/30 | 73 | 3.3 | 0.47 | 4.5 | 9.9 |
| 14 | 60/40 | 73 | 1.8 | 0.56 | 3.3 | 13.1 |

*Molar ratio—based on total 1-hexene from first and second stages and cyclooctene consumed during the first stage.

EXAMPLE 15

Propylene, 8.8 grams (gm.) (0.21 mole) was collected in a cooled 4-ounce (oz.) bottle and the bottle was sealed with a self-sealing gasket and perforated screw-cap. A nitrogen-sparged mixture of 40 ml. of benzene and 11 ml. (0.085 mole) of cyclooctene was injected into the bottle with a syringe. The bottle was allowed to come to room temperature and then 2.6 ml. of $WCl_6 \cdot EtOH$ solution and 2.4 ml. of $EtAlCl_2$ solution were injected into the bottle. After 2 hours, analysis by gas chromatography indicated that 22% of the cyclooctene had undergone reaction to give the cross-metathesis product.

The bottle was vented to remove excess propylene and 25 gm. (0.3 mole) of 1-hexene and 50 ml. of benzene were added. The mixture was sparged with nitrogen and 1.2 ml. of $Et_3Al$—$TiCl_4$—$VCl_4$ preformed catalyst suspension and 0.8 ml. of $AlEt_3$ solution were added. The copolymerization was run for 72 hours at room temperature yielding 26.6 gm. of copolymer having inherent viscosity of 3.2. The copolymer was compounded according to the recipe used in Examples 9 and 10. Curing was done at 300°F. for 20 minutes. The vulcanizate properties are listed below:

| | |
|---|---|
| Tensile strength, psi | 1524 |
| Elongation at break, % | 520 |
| 300% Modulus, psi | 990 |

EXAMPLE 16

The same procedure was used as in the cross-metathesis reaction of Example 3 except that larger quantities were utilized to give 420 ml. of the cross-metathesis reaction product.

In the copolymerization reaction, 943 ml. of benzene was added to a 2-liter reaction flask maintained under a nitrogen atmosphere. The benzene was cooled in an icebath and saturated with ethylene and propylene prior to the addition of the cross-metathesis product. Subsequently, 8.0 ml. $Et_3Al_2Cl_3$ solution and 8.0 ml. of $VOCl_3$ solution were added. Ethylene and propylene were continuously fed to the polymerization reaction at a rate of 250 ml./minute for a period of 1.5 hours. The polymerization was then terminated with methanol.

The reaction product was precipitated in methanol and dried. The rubbery material was compounded according to the recipe in Examples 9 and 10 except that ISAF black was omitted. Curing was done for 30 minutes at 300°F. The vulcanizate exhibited a swelling ratio, Q, of 4.1.

EXAMPLE 17

To a solution of 24 ml. of benzene, 7.9 ml. (0.061 mole) cyclooctene and 18.7 ml. (0.152 mole) of 1-hexene in a 4-oz. bottle were added 3.6 ml. of $WF_6$ solution and 13.2 ml. of $EtAlCl_2$ solution. Approximately 90% of the cyclooctene was allowed to react to form the cross-metathesis product. In the copolymerization reaction, 30 ml. of benzene and 42 ml. (0.34 mole) of 1-hexene were added and the mixture was sparged with nitrogen for 2 minutes. Subsequently, 2 ml. of the $Et_3Al$—$TiCl_4$—$VCl_4$ preformed catalyst suspension and 1.35 ml. $Et_3Al$ were added. The polymerization was carried out for 72 hours at room temperature and yielded 25 gm. of a high molecular weight copolymer, inherent viscosity 2.5. The copolymer yielded a snappy vulcanizate when compounded with the recipe given previously in Examples 9 and 10, followed by curing.

EXAMPLE 18

The same procedure was used as in Example 3 except that 27 ml. of cyclooctene, 80 ml. of benzene, 50 ml. of 1-hexene, 3.2 ml. of tetrabutyltin solution and 6.4 ml. of tungsten hexachloride-diethylether solution were used. After a reaction period of 4 hours, this cross-metathesis reaction product was used as is, i.e., without purification, for the copolymerization reaction.

In the copolymerization reaction, 550 ml. of pentane, 120 ml. of 1-hexene, 26 ml. of the cross-metathesis product, 1.6 ml. of diethylaluminum chloride solution and 1.6 ml. of α-titanium trichloride suspension were charged to a reaction vessel. After 16 hours of polymerization at ambient temperature, the copolymer was precipitated utilizing methanol and dried to give 63.5 gm. (71% conversion) of product, inherent viscosity of 7.1. This copolymer was compounded as in Examples 9 and 10 and cured for 30 minutes at 310°F. The resulting vulcanizate showed the following properties:

| | |
|---|---|
| Tensile strength, psi | 2140 |
| Elongation at break, % | 440 |
| 300% Modulus, psi | 1160 |
| Q | 3.0 |
| % Sol. | 2.5 |

While certain representative embodiments and details have been shown for the purpose of illustrating the invention, it will be apparent to those skilled in this art that various changes and modifications may be made therein without departing from the spirit or scope of the invention.

What is claimed is:

1. A process for preparing sulfur vulcanizable copolymers by bringing at least one α-olefin and at least one cyclomonoolefin and/or a nonconjugated cyclopolyolefin into contact with a catalyst capable of promoting olefin cross-metathesis between an α-olefin and a cyclomonoolefin or a nonconjugated cyclopolyolefin, then reacting said olefin cross-metathesis product mixture without catalyst removal with at least one α-olefin using a coordination catalyst comprising at least one metal compound, the metal portion of which is selected from the transition metals of Groups IVb and Vb of the Periodic Table in conjunction with at least one organometallic compound, the metal portion of which is selected from metals of Groups Ia, IIa, IIb and IIIa of the Periodic Table.

2. A process according to claim 1 wherein the cyclomonoolefin is at least one selected from the group of cyclobutene, cyclopentene, cyclooctene, cyclononene, cyclodecene, cycloundecene and cyclododecene.

3. A process according to claim 1 wherein the α-olefins contain from 2 carbon atoms through 20 carbon atoms.

4. The process according to claim 1 wherein the reaction temperature is from about −20°C. to about 100°C.

5. The process according to claim 1 wherein the olefin cross-metathesis catalyst comprises
A. at least one organometallic compound wherein the metal portion is selected from the group consisting of Ia, IIa, IIb, IIIa and IVa Groups of the Periodic Table of Elements,
B. at least one metal derivative wherein the metal portion is selected from the group consisting of molybdenum and tungsten, and
C. at least one compound selected from a group consisting of oxygen and compounds of the general formula R—Y—R' wherein Y is selected from the group of oxygen and sulfur and wherein R and R' are radicals selected from the group consisting of (1) hydrogen, (2) alkyl, (3) aryl, (4) arylalkyl, (5) alkaryl, (6) alkenyl, (7) when Y is S and R' is H, then R can be thioalkyl, thioarylalkyl, and thioalkaryl, (8) when Y is O and R' is H, then R can be alkoxy, arylalkoxy and alkaryloxy, and (9) radicals of (2) through (8) wherein at least one hydrogen is substituted by a group selected from hydroxyl (OH) and thiol (SH).

6. The process according to claim 5 wherein the three catalyst components, (A), (B) and (C) as previously defined are within a molar ratio of (B)/(C) ranging from about 0.2/1 to at least about 20/1 and the molar ratio of (A)/(B) is within the range of about 0.5/1 to at least 15/1; more preferred ratios are (B)/(C) of 0.5/1 to 5/1 and (A)/(B) of 0.5/1 to 8/1; still more preferred ratios are (B)/(C) of 1/1 to 2/1 and (A)/(B) of 0.75/1 to 5/1.

7. The process according to claim 1 wherein the coordination catalyst comprises one or more salts of a transition metal such as titanium, zirconium, hafnium, vanadium, niobium or tantalum and the salts are halides, oxyhalides, alcoholates, sulfates, nitrates, phosphates, acetates, propionates, benzoates, acetylacetonates and the like; in conjunction with one or more organometallic compounds of metals of Groups Ia, IIa, IIb and IIIa of the Periodic Table where the organic groups are preferably alkyl groups containing 1–10 carbon atoms or aryl groups such as phenyl, tolyl or napththyl and when the metal compound is multivalent, any valence not satisfied by an organic group may be satisfied by hydride, chloride, bromide, iodide or fluoride.

8. The process according to claim 7 wherein the molar ratio of the organometallic compound/transition metal salt is from about 0.5 to 15, preferably about 0.75 to 5, most preferably about 2 to 3.

9. A process according to claim 1 wherein the olefin cross-metathesis catalyst consists of (A) tetralkyltin, (B) tungsten halide and (C) dialkyl ether and the molar ratio of (A)/(B) ranges from about 0.5/1 to 15/1 and the molar ratio of (B)/(C) ranges from 0.2/1 to 20/1.

10. A process according to claim 1 wherein the olefin cross-metathesis catalyst consists of (A) alkylaluminum halide, (B) tungsten halide and (C) an alcohol and the molar ratio of (A)/(B) ranges from 0.5/1 to about 15/1 and the molar ratio of (B)/(C) ranges from about 0.2/1 to about 20/1.

11. Sulfur vulcanizable unsaturated rubber-like copolymers produced by the process according to claim 1.

12. Sulfur vulcanizable unsaturated rubber-like copolymers produced by the process according to claim 11 wherein the cross-metathesis reaction is between at least one α-olefin containing 3 carbon atoms through 6 carbon atoms and at least one cyclomonoolefin and/or nonconjugated cyclopolyolefin containing 5 carbon atoms through 12 carbon atoms, and the α-olefin for copolymerization is at least one selected from the group consisting of ethylene, propylene, butene, pentene and hexene.

* * * * *

UNITED STATES PATENT OFFICE
CERTIFICATE OF CORRECTION

PATENT NO. : 3,859,263
DATED : January 7, 1975
INVENTOR(S) : James M. O'Connor, Richard R. Smith and Joginder Lal It is certified that error appears in the above-identified patent and that said Letters Patent are hereby corrected as shown below:

Column 1, line 23, change "acylclic" to -- acyclic --;
line 63, insert a period between "hexachloride ethanol as follows: -- hexachloride . ethanol --;

Column 2, line 1, add -- n -- after the bracket in the formula to read as follows:
-- $CH_2 = CH(CH_2)_6$ -- $CH \}_n CHC_4H_9$ -- ;

Column 3, line 8, add a parenthis after "(2" to read -- (2) --;
Column 6, line 58, add -- ; -- after "aryllithium"
line 60, change "dialkylor" to -- dialkyl- or --;
Column 7, line 1, change "satls" to -- salts --;
line 27, change "organomettalic" to -- organometallic
line 32, change "naphthlstron-" to --naphthylstron- --
Column 9, line 26, change "precent" to -- percent --;
line 65, add -- ( -- before "α-olefin" to read:
-- (α-olefin + cycloolefin)/$WCl_6$ --;

Signed and Sealed this

Twenty-second Day of July 1980

[SEAL]

Attest:

SIDNEY A. DIAMOND

Attesting Officer   Commissioner of Patents and Trademarks